April 22, 1969

D. B. HERRERA 3,439,585

AIR BRAKE AND OPERATOR THEREFOR

Filed Sept. 12, 1966

DAN B. HERRERA
INVENTOR.

BY Kendrick, Subrow and Stolzy

ATTORNEYS

United States Patent Office 3,439,585
Patented Apr. 22, 1969

3,439,585
AIR BRAKE AND OPERATOR THEREFOR
Dan B. Herrera, 4063 Cudahy St.,
Huntington Park, Calif. 90255
Filed Sept. 12, 1966, Ser. No. 578,713
Int. Cl. F15b 15/10
U.S. Cl. 92—130                              7 Claims

ABSTRACT OF THE DISCLOSURE

A spring-powered brake actuator for operation in the event of pneumatic or hydraulic failure includes an actuator spring having a generally hourglass shape, i.e., each of its surface engaging ends having spring loops of substantially the same diameter and the spring loop diameter decreasing to a minimum intermediate the ends and further includes a spring guide means.

---

This invention relates to air brakes, and more particularly to a safety brake.

In the past, it has been the practice to use a barrel shaped spring to apply the brakes of a vehicle in case of a failure in the supply of compressed air thereto. Such a spring has the form of a helix. However, the end turns of the helix have a small diameter. The diameter of the turns gradually increases along the length of the helix from each end thereof toward the midpoint along the length thereof. The diameter of the helix is thus a maximum at the said midpoint.

The barrel shaped spring of the prior art is employed because it collapses to a small size when compressed. Thus, for example, when such a spring is compressed to its shortest length the smaller end turns nest partially or totally inside of the larger intermediate turns. The minimum compressed length may thus be considerably less than the product of the number of turns and the width of a turn. In the case of a spring made from cylindrical steel rod, the width of a turn is equal to the diameter of the rod.

In operation, emergency air keeps the brakes from being actuated through the use of a rubber diaphragm. Thus, when emergency air is up to full pressure, the barrel spring is compressed. The diaphragm must necessarily be a rather delicate structure. It is easily abraded by structures touching it and by other structures in its vicinity. Further, by law, the barrel shaped spring and the spring of the present invention to be described sometimes must supply a brake actuating force of over 2000 pounds when the spring is compressed. Due to the small size of the end turns of the barrel shaped spring, it often becomes cocked out of shape and stresses and damages or tears the diaphragm. This is due to the odd angle at which its axis becomes located. At the same time, it is also due to the force of thousands of pounds which it exerts upon the diaphragm. Still further, as stated previously, the rubber material of the diaphragm is rather delicate and can be damaged easily. It must be able to stretch and to flex and to turn almost inside out.

In any event, the barrel shaped spring of the prior art suffers from several serious disadvantages. It is relatively weak for its size because both of its ends have such small turns. It also is weak because it cocks in an air brake housing. That is, it becomes unbalanced due to its small end turns. Its axis then becomes misaligned with the housing axis. Its line of force in actuating the brakes is thus not in line with the brake actuating member. A reduction in force thus develops because the spring pushes the said member at an angle relative to the direction in which its movement is guided in the housing. Further, this misalignment can cause the rupture of the diaphragm, as stated previously.

In accordance with the device of the present invention, the above-described and other disadvantages of the prior art are overcome by providing a combination of structures in an air brake to apply the brakes when the air supply fails. This combination of structures includes a coiled spring and a housing therefor. The coiled spring urges the brakes to an actuated position when it is compressed. The spring has the shape of a helix. The diameter of the helix gradually increases in both directions along the length thereof from a minimum diameter at a position intermediate the ends of the helix, to a diameter at each end of the helix larger than the minimum diameter. The coiled spring of the present invention is employed in lieu of the barrel shaped spring of the prior art.

In accordance with the description of the coiled spring of the present invention set forth above, the spring of the invention may be described as an "hourglass" spring. It is believed that this fairly describes the spring helix of the present invention because the helix is more or less necked at a position along the length thereof, as is the small, intermediate portion of the hourglass.

The hourglass spring of the present invention has all of the advantages of the prior art barrel spring, but it has none of its disadvantages. The hourglass spring's smaller diameter turns nest inside the larger diameter turns, just the same as the smaller diameter turns of the barrel spring nest inside the larger turns thereof. The hourglass spring of the present invention thus can be compressed to a length which is much shorter than the product of the number of turns and the width of a turn.

The device of the present invention may also be used in an air brake and operator therefor employing a rubber diaphragm. However, due to the fact that the relatively large end turns of the hourglass spring of the present invention keep it stable and in alignment, rupture of the diaphragm is prevented.

The hourglass spring of the present invention is relatively strong for its size. One reason for this is that it has large turns at both of its ends. This means that its turns are larger than the turns of the barrel spring at not one but at both of the ends thereof. Further, the housing need not be any larger for the hourglass spring of the present invention than that needed to house a barrel spring of the same maximum diameter. This is true because it is not generally practical to shape the housing to fit the spring precisely along its entire length. Further, it is more economical and easier to make a housing approximately cylindrical with very little or no change in its inside and outside diameters.

The hourglass spring of the present invention is also relatively strong because it maintains itself in a stable position with its axis identical to that of a member which applies the brakes. Thus, it provides a substantial advantage over the barrel spring of the prior art because the hourglass spring of the present invention does not cock inside the housing. The large turns of both ends of the hourglass spring balance the spring when it is maintained in a tightly compressed position. The line of force applied by the hourglass spring of the present invention is always in line with the direction of the movement of the brake actuating member. Thus, no reduction in the force develops because the spring does not push the said member at an angle relative to the direction in which its movement is guided in the housing.

U.S. Patent No. 3,117,496 is herein cited as a reference showing a barrel shaped spring.

It is to be noted that hourglass springs of certain types are old in the art. However, each one of such springs are very lightly constructed, and none of them are the heavy type of spring required to apply the brakes in an air brake in the event of the failure of the air supply. For example, a small hourglass spring has been employed to return a brake pedal as shown in U.S. Patent No. 2,848,980.

Hourglass springs have also been employed in other diverse arts to return mechanical linkages where no considerable force is required. A small return spring is thus shown in U.S. Patent No. 2,373,259 for shifting gears in a mechanical power transmission. This patent issued on Apr. 10, 1945 to E. R. Price for Transmission Operating Mechanism. Small hourglass springs also have been employed in a great many other unrelated arts, such as in coil springs for seat cushions and the like or other shock absorbing devices as shown in U.S. Patent No. 2,859,959.

The above-described and other advantages of the present invention will be better understood from the following description when considered in connection with the accompanying drawing.

In the drawing, which is to be regarded as merely illustrative:

Figure 1:
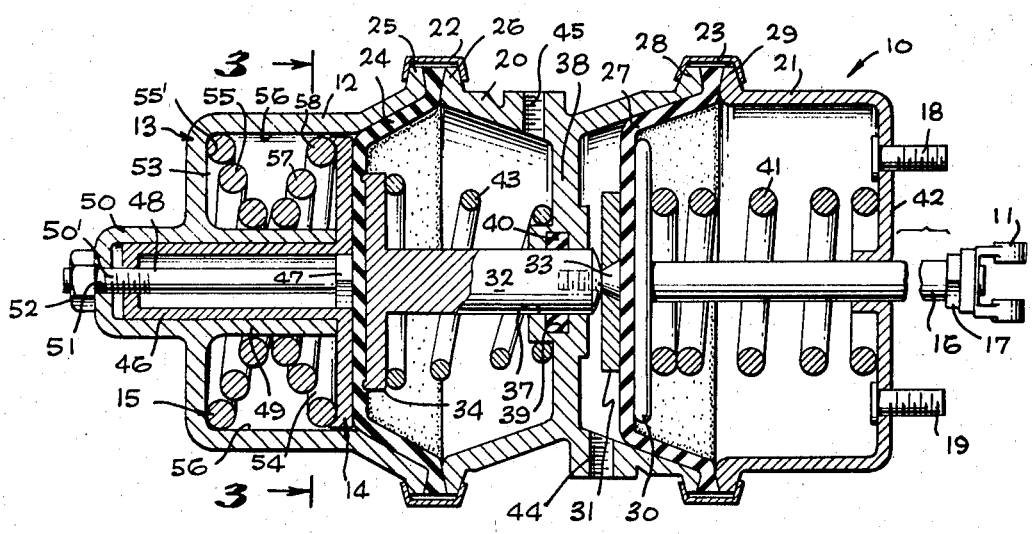
FIG. 1 is a longitudinal, sectional view of an air brake and operator therefor.

In the drawing in FIG. 1 an air brake and a operator therefor are indicated at 10 including an operator clevis arm 11, which applies the brakes when it is moved to the right as viewed in FIG. 1. All of the structures shown in FIG. 1 may be conventional except a portion 12 of a housing 13, a plate 14, and an hourglass spring constructed in accordance with the present invention and illustrated at 15.

As is conventional, arm 11 is threaded to a rod 16. Arm 11 is maintained in a flexible, stationary position on a rod 16 by a lock nut 17. Housing 13 is mounted to a motor vehicle by conventional bolts or studs 18 and 19.

Beside portion 12, housing 13 has portions 20 and 21. Portions 12 and 20 are fixed together by a conventional compression ring 22. Similarly, housing portions 20 and 21 are fixed together by a compression ring 23. The edges of a circular, elastomeric or rubber diaphragm 24 are retained between flanges 25 and 26 of housing portions 12 and 20 inside ring 22 as is conventional. Similarly, a circular, elastomeric or rubber diaphragm 27 is retained between flanges 28 and 29 on housing portions 20 and 21 inside ring 23.

A plate 30 is fixed to a plate 31 through diaphragm 27 in conventional manner. Plate 31 is fixed to a rod 32 by a bolt 33. Rod 32 is cast integrally with a plate 34. Plate 34 is fixed to plate 14 in a conventional manner.

Notwithstanding the foregoing, it is not absolutely necessary to fix plates 30 and 31 together. The same is true of plates 34 and 14. This is true because rod 16 is guided in a bore 37 of a partition 38 in housing portion 20.

Partition 38 has an angular recess or groove 39 therein which carries packing 40 to provide an airtight seal from one side of partition 38 to the other side thereof.

A coiled spring 41 is positioned between an end 42 of housing portion 21 and plate 30. A coiled spring 43 is provided between plate 34 and partition 38.

Housing portion 20 has openings 44 and 45 thereinto. Air is supplied through opening 44 to apply the brakes. Emergency air is supplied through opening 45 to release the brakes at all times that air is not applied through opening 44. Should the supply of air fail, air will not be supplied through either one of openings 44 and 45. In this case, contracted spring 15 will expanded to the position shown in FIG. 2 and apply the brakes.

Figure 2:
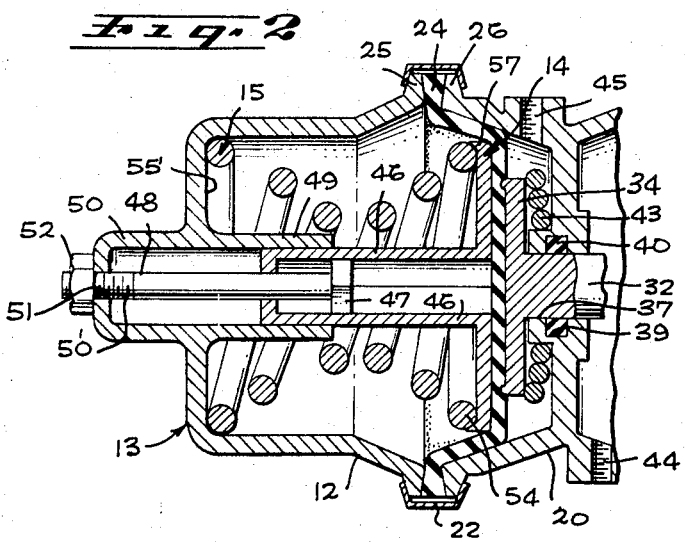
FIG. 2 is an operational view similar to the one shown in FIG. 1, wherein the hourglass spring of the present invention is expanded, the view shown in FIG. 1 being a view wherein the hourglass spring of the present invention is contracted.
Figure 3:
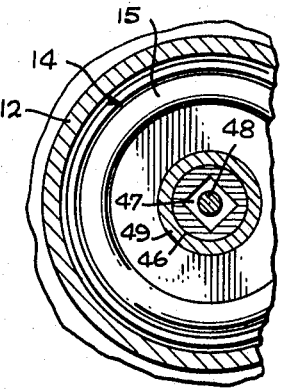
FIG. 3 is a transverse, sectional view of the air brake and operator taken on the line 3—3 shown in FIG. 1.

As shown in FIGS. 1 and 2, plate 14 is fixed to a hollow, elongated member 46, which is slidable over the square head 47 of a bolt 48. The interior of member 46 may thus be square. The exterior of member 46 may be cylindrical. Housing portion 12 has bosses at 49 and 50 that have cylindrical surfaces to mate with the external surface of member 46. Bolt 48 has a threaded shank 50', which extends through a hole 51 in the left end of housing portion 12 as shown in FIGS. 1 and 2. If desired, hole 51 may also be threaded. A nut 52 is threaded to the bolt at 50' outside of housing 13.

As shown in FIG. 1, end turns 53 and 54 of spring 15 are larger than intermediate turns 55, 56, 57 and 58 thereof. Note will be taken that spring 15 is in the shape of a helix. The diameter of the helix gradually decreases from maximum diameters at turns 53 and 54 to a minimum diameter at a position along the length thereof intermediate end turns 53 and 54.

End turn 53 fits contiguously to the internal surface of housing portion 12. In particular, end turn 53 will contact a portion of flat end surface 55 of housing 12. End turn 53 will also contact a portion of a cylindrical, internal surface 56 of housing portion 12, at least when the spring portion is compressed as shown in FIG. 1. Note will be taken that the turns of spring 15 will expand somewhat in diameter when spring 15 is compressed as shown in FIG. 1.

Also, as shown in FIG. 1, plate 14 has an annular lip 57, which extends around a portion of end turn 54. Lip 57 is of a size and shape such that in plate 14 end turn 54 is positioned contiguous to cylindrical surface 56 of housing portion 12, but spaced a short distance therefrom as shown in FIG. 1.

If desired, end turn 53 of spring 15 may have an outside diameter slightly larger than the inside diameter of surface 56, when spring 15 is unstressed. However, this condition need not be critically maintained. It is possible to have the outside diameter of turn 53 slightly smaller than the inside diameter of surface 56. In any event, surface 56 is cylindrical, or nearly so.

Figure 4:
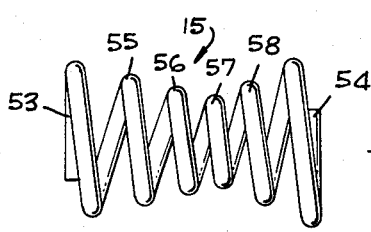
FIG. 4 is a side elevational view of an hourglass spring constructed in accordance with the present invention.

Note will be taken from FIG. 4 that at least a portion of end turns 53 and 54 has a zero pitch. Further, that portion of each of turns 53 and 54 which has a zero pitch also has constant diameter.

From the foregoing, it will be appreciated that turns 56 and 57 may nest inside of turns 55 and 58. In turn, turns 55 and 58 may nest inside of turns 53 and 54. Thus, under compression, spring 15 may be pressed to a very short length as shown in FIG. 1. Moreover, intermediate turns 56 in the compressed state have an internal diameter substantially the same as the external diameter of boss 49, but slightly exceeding the latter so as to permit receipt onto the boss, whereby the intermediate turns of the spring move along a substantially straight line parallel to the axis of the boss 49 throughout all compressive states of the spring. This is useful in the construction of air brakes and operators therefor because of the size and shape of the vehicles on which many are mounted.

Note will be taken that, in accordance with the device of the present invention, spring 15 is relatively strong for its size because the end turns 53 and 54 are about as large as housing 12, whereas both of the end turns of the barrel spring will be much smaller than the housing 12. The large end turns 53 and 54 of spring 15 also make spring 15 stable inside housing 12. Spring 15 cannot cock inside housing portion 12. Diaphragm 24 is thus protected. Further, no reduction in force is attendant upon the use of spring 15 because its axis lies on the axis of the entire unit. It therefore does not push at an angle relative to the axis of housing 12.

What is claimed is:

1. In an air brake, the combination comprising: a housing; a member slidable in said housing to apply the brakes, said member having a predetermined axis; a flexible diaphragm dividing said housing into first and second chambers; an emergency air port through said housing into said first chamber; a coiled spring in said second chamber, said spring having the shape of a helix, the diameter of said helix gradually increasing in both directions along the length thereof from a minimum diameter at a position intermediate the ends thereof to a diameter at each end thereof larger than said minimum diameter, said member being movable with said diaphragm toward said second chamber to release the brakes, said member being movable with said diaphragm toward said first chamber to apply the brakes, said spring being maintained in compression inside said second chamber, the axis of said helix being identical with that of said member, first guide means extending along the helical axis of the spring and having external dimensions substantially the same as the internal dimension of the minimum spring diameter whereby the minimum diameter portion of the spring is maintained at substantially the same disposition measured transversely of the spring axis throughout all compressive states of the spring, said second chamber having a diameter at one end thereof approximately equal to the outside diameter of one end turn of said helix contiguous thereto so as to cause said one end turn to fit snug therein at least upon compression of said spring; and a rigid plate having one of its major surfaces bearing against the diaphragm and its other major surface bearing against the other end turn of said helix, the outside of said other end turn being spaced from but positioned contiguous to said housing, said plate having an annular lip extending around an outside portion of said other end turn contiguous thereto, at least a portion of each end turn of said helix having a constant diameter and zero pitch.

2. The invention as defined in claim 1, wherein said housing includes second guide means for said member.

3. The invention as defined in claim 2, wherein said second guide means includes a partition having a bore to receive said member, a first elongated hollow body fixed to said housing inside said second chamber, a second elongated hollow body fixed to said plate and slidable in said first body, and a bolt fixed to said housing and positioned inside said second body, said bolt having a head to slide inside said second body.

4. In an air brake, the combination comprising: an operating arm movable in a predetermined direction to apply the brakes; a housing; a member fixed to said arm, said member being movable in said housing; means responsive to a source of emergency air for moving said member in a predetermined direction to cause said arm to release the brakes; safety means including a coiled spring in said housing urging said member to move in a direction opposite said predetermined direction, said spring having the shape of a helix, the diameter of said helix gradually increasing in both directions along the length thereof from a minimum diameter at a position intermediate the ends thereof to a diameter at each end thereof larger than said minimum diameter; and a guide extending along the helical axis of the spring and having external dimensions substantially the same as the internal dimension of the minimum spring diameter whereby the minimum diameter portion of the spring is maintained at substantially the same disposition measured transversely of the spring axis throughout all compressive states of the spring.

5. The invention as defined in claim 4, wherein said housing has a flat end surface, one end turn of said helix engaging said flat end surface, the outside diameter of said one end turn of said helix being approximately equal to the inside diameter of said housing so as to fit tightly in said housing at least when said spring is compressed, said air responsive means including a flexible diaphragm fixed in said housing and a plate fixed relative to said diaphragm and relative to said member, the other end turn of said helix bearing against said plate.

6. The invention as defined in claim 5, wherein at least a portion of each of the end turns of said helix have a constant diameter and a zero pitch.

7. The invention as defined in claim 6, wherein said plate has a lip extetnding around a portion of the exterior of the said other end turn of said helix, both said lip and said other end turn being positioned contiguous to but spaced a short distance from the internal surface of said housing.

References Cited
UNITED STATES PATENTS

| | | | |
|---|---|---|---|
| 274,715 | 3/1883 | Buckley | 267—61 X |
| 2,373,259 | 4/1945 | Price | 74—851 |
| 2,640,368 | 6/1953 | Schjolin | 92—130 X |
| 2,848,980 | 8/1958 | Ayers | 91—433 |
| 3,244,079 | 4/1966 | Herrera | 92—64 X |
| 3,282,169 | 11/1966 | Leighton | 92—63 X |
| 3,291,004 | 12/1966 | Stevenson et al. | 92—64 X |
| 3,331,291 | 7/1967 | Rumsey | 92—64 X |

MARTIN P. SCHWADRON, *Primary Examiner.*

I. C. COHEN, *Assistant Examiner.*

U.S. Cl. X.R.

92—63, 64